Figure 1:
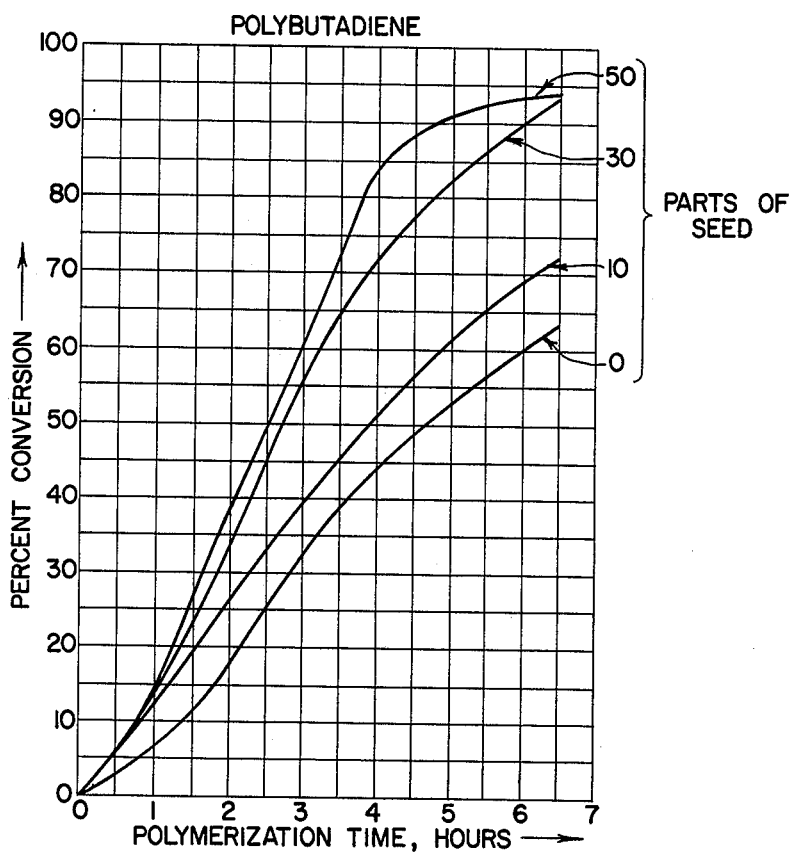

United States Patent [19]

Duke et al.

[11] 4,079,101
[45] Mar. 14, 1978

[54] DIOLEFIN POLYMERIZATION PROCESS IN THE PRESENCE OF SEED POLYMERS

[75] Inventors: June T. Duke, Chagrin Falls; Dorothy C. Prem, Warrensville Heights, both of Ohio

[73] Assignee: The Standard Oil Company, Cleveland, Ohio

[21] Appl. No.: 609,372

[22] Filed: Sep. 2, 1975

Related U.S. Application Data

[63] Continuation-in-part of Ser. No. 251,380, May 8, 1972, abandoned.

[51] Int. Cl.² ............... C08F 136/06; C08F 136/08; C08L 9/00
[52] U.S. Cl. ............... 260/879; 260/887; 526/201; 526/335
[58] Field of Search ............... 260/879, 942 R, 887; 526/201, 335

[56] References Cited

U.S. PATENT DOCUMENTS

| 3,372,134 | 3/1968 | Pierson et al. | 260/879 |
| 3,397,165 | 8/1968 | Goodman et al. | 260/879 |

*Primary Examiner*—Harry Wong, Jr.
*Attorney, Agent, or Firm*—John F. Jones; Sherman J. Kemmer

[57] ABSTRACT

A polymerization process is described in which conjugated diolefin polymers are prepared by free-radical polymerization at improved rates by conducting the polymerization in a batch charge of all ingredients in aqueous emulsion in the presence of some preformed seed polymer having small particle size.

6 Claims, 5 Drawing Figures

DIOLEFIN POLYMERIZATION PROCESS IN THE PRESENCE OF SEED POLYMERS

This is a continuation-in-part application of our co-pending patent application Ser. No. 251,380 filed May 8, 1972, now abandoned.

The present invention relates to an improved process for the polymerization of conjugated diene monomers and more particularly pertains to a batch charge process for the rapid polymerization and copolymerization of conjugated diolefin monomers such as butadiene-1,3 in the presence of preformed polymer particles in the polymerization mixture.

The homopolymers of butadiene-1,3 and similar conjugated diene monomers are well known to those skilled in the art. It is also well known that butadiene-1,3 and related conjugated diene monomers are relatively slow reacting monomers in free-radical addition homopolymerization reactions when compared with other common polymerizable vinyl monomers such as acrylonitrile, styrene, vinyl acetate, ethyl acrylate, methyl methacrylate, and the like. Polymers of butadiene-1,3 are known to be useful for a wide variety of purposes including rubbers, adhesives, and the like. One serious drawback to the use of homopolymers of butadiene-1,3 and related conjugated dienes is the fact that considerable time is consumed in their production and this adds to the cost of the polymers. We have discovered that the rate problem which exists in the homopolymerization of conjugated diene monomers is unexpected and does not exist for conjugated diene copolymers such as butadiene-styrene and butadiene-acrylonitrile copolymers.

It is therefore an object of this invention to provide a process for preparing conjugated diene homopolymers by an improved free-radical addition batch polymerization process which occurs at a much more rapid rate than do the prior art processes when they are applied to such monomers. That this and other desirable objects have been accomplished by the present invention will become apparent from the following description and examples.

We have discovered that butadiene-1,3 can be homopolymerized in a batch charge polymerization at a relatively rapid rate when there are included in the polymerization mixture some small particles of a preformed or "seed" polymer which may include butadiene homopolymer or copolymer. The resulting polymer is a blend containing the seed polymer.

Monomers which are useful alone or in various combinations of two or more for the production of "seed" polymer include in addition to butadiene the acrylate esters such as methyl acrylate, ethyl acrylate, the propyl acrylates, the butyl acrylates, the amyl acrylates, the hexyl acrylates, cyclohexyl acrylate, phenyl acrylate, the octyl acrylates, and the like; the methacrylate esters such as methyl methacrylate, ethyl methacrylate, the propyl methacrylates, the butyl methacrylates, the amyl methacrylates, the hexyl methacrylates, cyclohexyl methacrylate, phenyl methacrylate, the decyl methacrylates, and the like; vinyl esters such as vinyl acetate, vinyl propionate, the vinyl butyrates, vinyl benzoate, isopropenyl acetate, and the like; the vinyl aromatics such as styrene, alpha-methyl styrene, vinyl toluene, the vinyl xylenes, the vinyl naphthalenes, isopropenyl benzene, and the like; vinyl amides such as acrylamide, methacrylamide, N-methyl acrylamide, vinyl benzamide, N-vinyl pyrrolidone, maleimide, and the like; the vinyl halides such as vinyl chloride, vinyl bromide, vinyl fluoride, vinylidene chloride, vinylidene fluoride, dichloro difluoro ethylene, tetrafluoroethylene, the halostyrenes, and the like; olefins such as ethylene, propylene, isobutylene, butene-1, diisobutylene, and the like.

The preferred method of polymerization in our process is aqueous emulsion batch charge polymerization in the presence of an emulsifier and a free-radical generating polymerization initiator in the range of from 15 to 60% total solids and preferably to a high conversion, i.e., about 50% or higher conversion of monomers to polymer, at a temperature in the range of from about 0° C to 100° C in the substantial absence of oxygen. In a batch charge emulsion polymerization all of the polymerization ingredients, including water, emulsifier, monomer, catalyst, etc., are present at the beginning of the polymerization reaction.

Suitable emulsifiers include fatty-acid soaps such as sodium laurate; organic sulfates and sulfonates such as sodium lauryl sulfate, the alkali metal salts of sulfonated petroleum or paraffinic oils, the sodium salts of aromatic sulfonic acids such as the sodium salts of naphthalene sulfonic acids, the sodium salts of dodecane-1-sulfonic acid, octadecane-1-sulfonic acid, etc.; aralkyl sulfonates such as sodium isopropyl benzene sulfonate, sodium isobutyl naphthalene sulfonate, and alkali metal salts of polymerized alkyl naphthalene sulfonic acids; alkali metal and ammonium salts of sulfonated dicarboxylic acid esters and amides such as sodium dodecyl sulfosuccinate, sodium N-octadecyl sulfosuccinamate, the polyalkyl and polyalkaryl alkoxy alkylene phosphonate acids and salts more fully described in U.S. Pat. No. 2,853,471, and the like; the so-called cationic emulsifiers such as the salts of strong inorganic acids and organic bases containing long carbon chains, for instance, lauryl amine hydrochloride, the hydrochloride of diethyl aminoethyl decyl amine, trimethyl cetyl ammonium bromide, dodecyl trimethyl ammonium bromide, the diethyl cyclohexylamine salt of cetyl sulfonic esters. Nonionic emulsifiers also may be used and these include the polyether alcohols prepared by condensing ethylene or propylene oxide with higher alcohols, the fatty alkylamine condensates, the diglycol esters of lauric, oleic, and stearic acids, and others. It is often desirable to add post-polymerization emulsifiers to the latices embodied herein for improved stability.

The polymerization catalyst or initiator, usually required for satisfactory polymerization rate, may be any of those commonly employed for the polymerization of vinyl monomers and include the various peroxygen compounds such as hydrogen peroxide, benzoyl peroxide, pelargonyl peroxide, t-butyl peroxypivalate, cumene hydroperoxide, t-butyl hydroperoxide, t-butyl perbenzoate, sodium, potassium, and ammonium persulfate, and others such as those disclosed in U.S. Pat. Nos. 2,471,959 and 2,491,471.

Particularly preferred as polymerization initiators are the water-soluble peroxygen compounds such as hydrogen peroxide, and the sodium, potassium, and ammonium persulfates, the water-soluble oxidation-reduction or "redox" types of catalysts, and the heavy metal-activated, water-soluble peroxygen and redox catalysts. Included in this list are the water-soluble persulfates; the combination of one of the water-soluble peroxygen compounds such as potassium persulfate with a reducing substance such as a polyhydroxy phenol, an oxidizable sulfur compound such as sodium bisulfite, sodium sulfite, and the like; the combination of a water-soluble peroxygen compound such as potassium persulfate and dimethyl amino-propionitrile; the combination of a water-soluble peroxygen compound with a reducing sugar or with a combination of a dimercapto compound and a water-soluble ferricyanide compound, and others. Heavy metal ions which greatly activate potassium persulfate and the redox-catalyzed polymerizations include those of silver, copper, iron, cobalt, nickel, and others. The azo-type initiators, such as azobisisobutyronitrile, are particularly useful in the process of this invention. The preferred range of initiator is from about 0.01 to about 5 parts by weight per 100 parts by weight of monomers.

Although the polymerization can be carried out in the presence of air, the initiation period is longer and thus it is preferred to conduct the polymerization reaction in the substantial absence of oxygen by conducting it at reflux or in an inert atmosphere such as nitrogen or helium and the like. The temperature at which the polymerization is carried out is not critical; it may be varied widely from −30° C to 100° C or higher, though best results are generally obtained at a temperature in the range of from about 0° C to about 70° C. The final polymer latex may be adjusted to any desired pH. Other substances such as buffers, electrolyte salts, mercaptan modifiers, and the like can be incorporated in the polymerization mixture.

In a preferred process of this invention, 100 parts by weight of a diene monomer component, such as butadiene-1,3, is homopolymerized in aqueous emulsion in the presence of a free-radical initiator and in the presence of from about 5 to about 160 parts by weight of a seed polymer latex having an average particle size between about 300 and 1000 A.

Preferred polymers used as the seed polymer are polymers prepared in aqueous emulsion and employed in the form of an emulsion in our polymerization process, and those preferred polymers include polymethacrylonitrile, copolymers of methacrylonitrile having up to 20% by weight in them of another monovinyl monomer, polystyrene, polymethyl acrylate, polymethyl methacrylate, polyacrylonitrile, and acrylonitrile copolymers containing up to 30% by weight of another monovinyl monomer and mixtures thereof.

The process of this invention is further illustrated in the following examples in which the amounts of ingredients and products are expressed in parts by weight unless otherwise specified.

EXAMPLE 1

A. A seed latex of a methacrylonitrile-methyl methacrylate copolymer was prepared employing the following ingredients:

| Ingredient | Parts |
|---|---|
| methacrylonitrile | 95 |
| methyl methacrylate | 5 |
| Lupersol 11* (initiator) | 0.5 |
| n-dodecyl mercaptan | 0.5 |
| Gafac RE-610** (emulsifier) | 4.0 |
| Hampene K$_4$100*** | 0.05 |

-continued

| Ingredient | Parts |
|---|---|
| distilled water | 225 |

*75% by weight solution of t-butyl peroxy pivalate in mineral spirits.
**A mixture of R—O—(CH$_2$CH$_2$O—)$_n$PO$_3$M, and [R—O—(CH$_2$CH$_2$O—)$_n$]$_2$PO$_2$M wherein n is a number from 1 to 40, R is an alkyl or alkaryl group and preferably a nonyl phenyl group and M is hydrogen, ammonia or an alkali metal which composition is sold by GAF Corporation.
***Tetrapotassium salt of ethylene diamine tetra-acetic acid (chelating agent).

The solution of water, emulsifier and chelating agent was well mixed first and pH was adjusted to 7 with KOH. The polymerization was conducted at 60° C. The resulting latex had a total solids content of 29.6% corresponding to a monomer conversion to polymer of 92.8% by weight. The average size of the latex particles was found to be about 450 A by electron microscopy.

B. Several polybutadienes were prepared in emulsion in accordance with the present invention in the presence of some seed latex from A above. The following ingredients were used in this polymerization:

| Ingredient | Parts |
|---|---|
| butadiene-1,3 | 100 |
| Lupersol 11 | 0.5 |
| Gafac RE-610 | 3.0 |
| water | 225 |
| Hampene K$_4$100 | 0.05 |
| latex A | variable |

The water, emulsifier and chelating agent were well mixed and pH was adjusted to 7 with KOH. The remaining ingredients were added as follows: seed latex, butadiene, mercaptan and initiator. Batch charge polymerization was carried out with stirring under a nitrogen atmosphere at 60° C. Experiments were carried out with varying amounts of seed latex A as shown in Table 1; monomer conversions to polymer with time was determined in each case and are shown in Table 1.

Table 1

| Parts Seed | | Hours from | |
|---|---|---|---|
| Per 100 Parts Resin$^{(a)}$ | Per 100 Parts Monomer$^{(b)}$ | Start of Polymerization | % Conversion |
| none | none | 2 | 18 |
| | | 4 | 45 |
| | | 6½ | 64 |
| 10 | 11.1 | 2 | 26 |
| | | 4 | 52 |
| | | 6½ | 73 |
| 30 | 42.8 | 2 | 34 |
| | | 4 | 73 |
| | | 6½ | 94 |
| 50 | 100.0 | 2 | 38 |
| | | 4 | 85 |
| | | 6½ | 94 |

$^{(a)}$Calculated as parts by weight of seed resin per 100 parts of total polymer at 100% conversion of added monomers (butadiene).
$^{(b)}$Parts of seed resin per 100 parts of butadiene.

The results showing effect of variation in amounts of seed latex in the emulsion polymerization of butadiene on the rate of polymerization of butadiene are shown graphically in FIG. 1.

EXAMPLE 2

A. A seed latex was prepared according to the following recipe:

| Ingredient | Parts |
|---|---|
| acrylonitrile | 75 |
| methyl acrylate | 25 |
| potassium persulfate | 0.06 |

-continued

| Ingredient | Parts |
|---|---|
| n-dodecyl mercaptan | 1.0 |
| chelating agent | 0.05 |
| emulsifier | 3.0 |
| water | 200 |

The polymerization was carried out by the procedure described in Example 1A. The first latex had a total solids content of 33.5% which corresponds to a conversion of monomers to polymer of 98%. The average size of the latex particles was found to be 800 A by electron microscopy.

B. Butadiene and isoprene were homopolymerized in aqueous emulsion employing some of the latex A of this example employing the following recipe:

| Ingredient | Parts |
|---|---|
| butadiene or isoprene | 100 |
| potassium persulfate | 0.2 |
| t-dodecyl mercaptan | 0.5 |
| emulsifier | 3.0 |
| water | 250 |
| latex A of this example | variable |

The batch polymerization was carried out as described in Example 1B. Data for the control (no latex A), 10 and 30 or 50 parts seed are shown in Table 2.

Table 2

| Polybutadiene | | | |
|---|---|---|---|
| Parts Seed | | | |
| Per 100 Parts Resin | Per 100 Parts Monomer | Hours from Start of Polymerization | % Conversion |
| none | none | 1.3 | 7 |
|  |  | 3.4 | 14 |
|  |  | 6 | 29 |
| 10 | 11.1 | 2.2 | 8 |
|  |  | 4.3 | 26 |
|  |  | 7 | 40 |
| 30 | 42.8 | 2.2 | 16 |
|  |  | 4.3 | 40 |
|  |  | 7 | 60 |
| Polyisoprene | | | |
| none | none | 1.3 | 1 |
|  |  | 3.4 | 8 |
|  |  | 6 | 18 |
| 10 | 11.1 | 2.2 | 5 |
|  |  | 4.4 | 18 |
|  |  | 7 | 36 |
| 50 | 100.0 | 2.3 | 33 |
|  |  | 4.4 | 46 |
|  |  | 7 | 72 |

Figure 2:
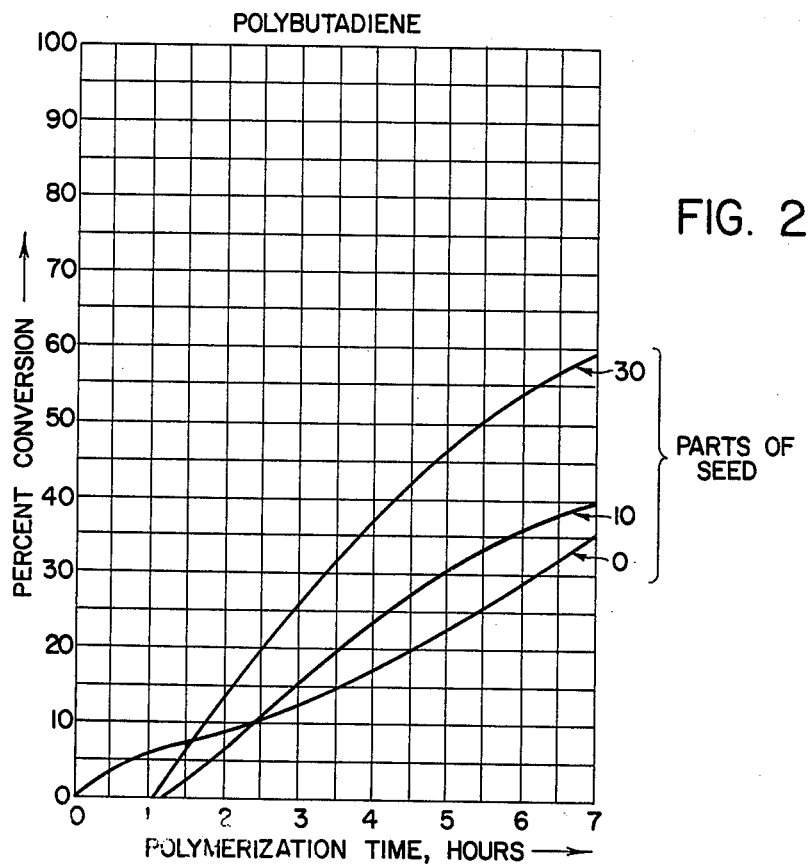
Figure 3:
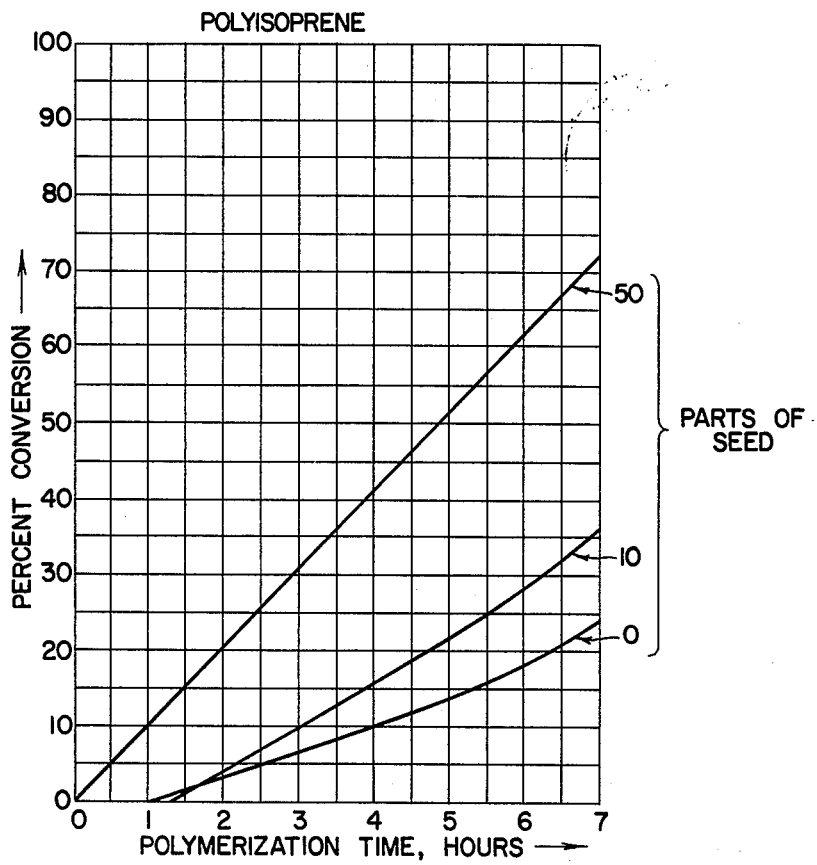

The conversion data for polybutadiene prepared in this manner are given in FIG. 2 and for polyisoprene in FIG. 3.

EXAMPLE 3

A. Several types of monomers were used in the preparation of seed latexes using the following recipe:

| Ingredient | Parts |
|---|---|
| monomer | 100 |
| potassium persulfate | 0.06 |
| n-dodecyl mercaptan | 1.0 |
| chelating agent | 0.05 |
| emulsifier | 3.0 |
| water | 200 |

Polymers were prepared from the monomers listed below.

| Monomer | Latex Total Solids | % Conversion | Latex Particle Size |
|---|---|---|---|
| styrene | 34.2 | 99 | 650 A |
| methyl acrylate | 33.8 | 99 | 500 A |
| methyl methacrylate | 34.3 | 100 | 580 A |

B. Polybutadienes were prepared by batch charge polymerization from the following recipe:

| Ingredient | Parts |
|---|---|
| butadiene | 100 |
| potassium persulfate | 0.2 |
| t-dodecyl mercaptan | 0.5 |
| emulsifier | 3.0 |
| water | 250 |
| latex A of this example | variable |

Figure 4:
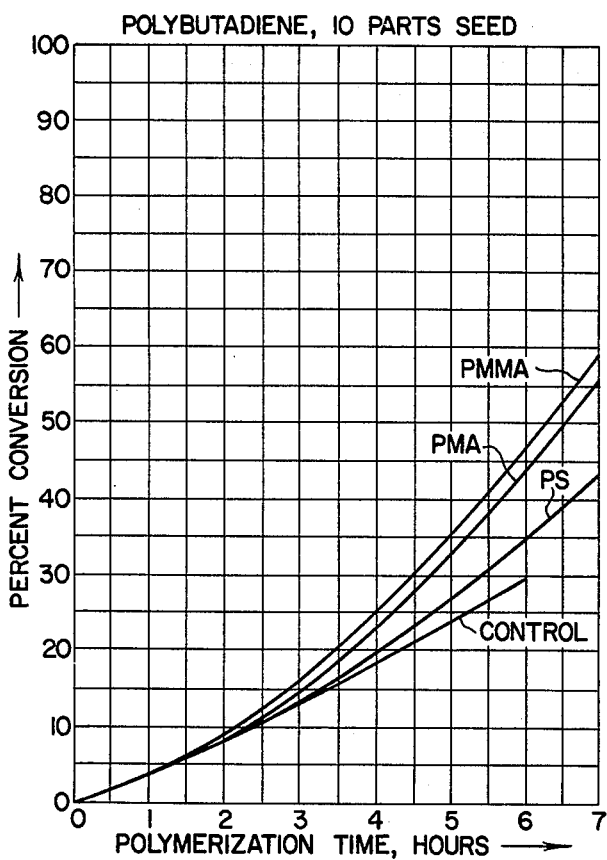
Figure 5:
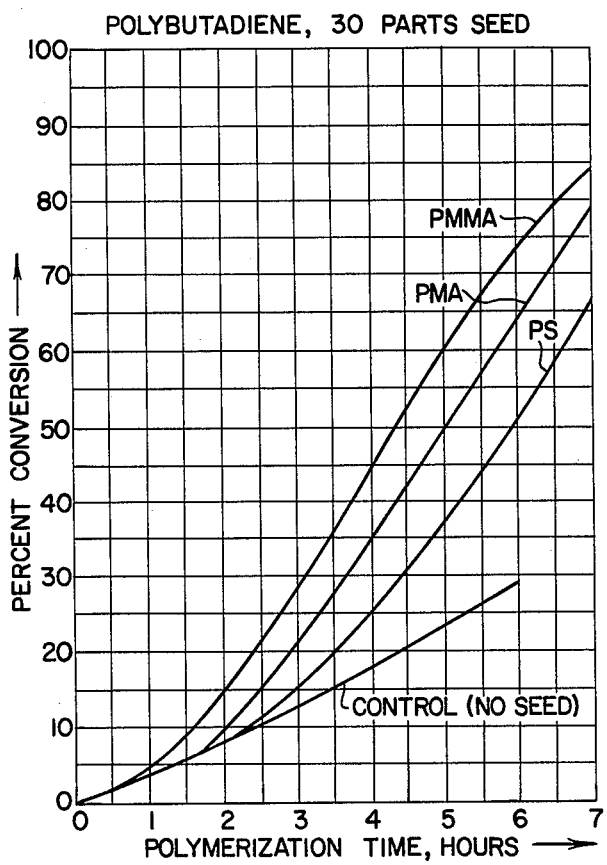

The results of these runs are given in Table 3 and are shown graphically in FIGS. 4 and 5.

Table 3

| Polystyrene (PS) Seed | | | |
|---|---|---|---|
| Parts Seed | | | |
| Per 100 Parts Resin | Per 100 Parts Monomer | Hours from Start of Polymerization | % Conversion |
| 10 | 11.1 | 2 | 6 |
|  |  | 4 | 19 |
|  |  | 7 | 43 |
| 30 | 42.8 | 2 | 8 |
|  |  | 7 | 66 |
| Polymethylacrylate (PMMA) Seed | | | |
| 10 | 11.1 | 2 | 1 |
|  |  | 7 | 56 |
| 30 | 42.8 | 2.1 | 10 |
|  |  | 4.2 | 38 |
|  |  | 7 | 79 |
| Polymethylmethacrylate (PMA) Seed | | | |
| 10 | 11.1 | 2.1 | 10 |
|  |  | 4.2 | 20 |
|  |  | 7 | 59 |
| 30 | 42.8 | 2.1 | 13 |
|  |  | 4.2 | 49 |
|  |  | 7 | 85 |
| none | none | 1.3 | 7 |
|  |  | 3.4 | 14 |
|  |  | 6 | 29 |

EXAMPLE 4

A copolymer of about 70 parts by weight of butadiene and 30 parts by weight of sytrene, which is outside the scope of the present invention, was prepared alone and in the presence of a polystyrene seed latex and in the presence of a polybutadiene seed latex from the following recipe:

| Ingredient | Parts |
|---|---|
| butadiene | 70 |
| styrene | 30 |
| potassium persulfate | 0.20 |
| t-dodecyl mercaptan | 0.50 |
| Gafac RE-610 | 3.00 |
| water | 250.00 |
| seed latex | variable |

The polymerizations were run at 50° C. The results of these runs are given in Table 4.

Table 4

| Polystyrene Seed | | |
|---|---|---|
| Parts Seed per 100 Parts Monomer | Hours from Start of Polymerization | % Conversion |

Table 4-continued

| | | |
|---|---|---|
| 20 | 2 | 2 |
| | 4 | 12 |
| | 8 | 25 |
| | 20 | 56 |
| | 22 | 61 |
| | Polybutadiene Seed | |
| 30 | 2 | 2 |
| | 4 | 12 |
| | 8 | 27 |
| | 20 | 62 |
| | 22 | 66 |
| | No Seed, Control | |
| 0 | 2 | 3 |
| | 4 | 6 |
| | 8 | 18 |
| | 20 | 63 |
| | 22 | 69 |

Thus, it can be seen that using seed latex in the copolymerization of butadiene and styrene has no effect on the polymerization rate.

EXAMPLE 5

The procedure of Example IV of U.S. Pat. No. 3,372,134 was repeated along with a control using no polystyrene seed latex and the relative rates of copolymerization of butadiene-styrene were determined.

A polystyrene seed latex was prepared from the following ingredients:

| Ingredient | Parts |
|---|---|
| styrene | 100.0 |
| potassium persulfate | 0.11 |
| n-dodecyl mercaptan | 0.25 |
| tripotassium phosphate | 0.30 |
| Dresinate 731 (70% active) | 6.43 |
| water | 180.0 |

The polymerization was carried out at 122° F in accordance with Example II of U.S. Pat. No. 3,372,134.

The polymerization of butadiene was followed using the following ingredients:

| Ingredient | Parts |
|---|---|
| butadiene | 70.0 |
| styrene | 30.0 |
| t-dodecyl mercaptan | 0.10 |
| tripotassium phosphate | 0.11 |
| sodium hydrosulfite | 0.02 |
| oleic acid | 2.35 |
| potassium hydroxide | 0.48 |
| water | 95.0 |
| diisopropyl benzene hydroperoxide | 0.045 |
| sodium formaldehyde sulfoxalate | 0.037 |
| ferrous sulfate | 0.005 |
| versene FE-3 | 0.01 |
| water | 5.0 |
| polystyrene seed latex | variable |

The polymerizations were carried out at 60° F ± 1° F.

The results of these runs are given in Table 5.

Table 5

| Parts Seed per 100 Parts Monomer | Hours from Start of Polymerization | % Conversion |
|---|---|---|
| 0 | 2 | 3.5 |
| | 4 | 7 |
| | 8 | 13 |
| | 20 | 31 |
| | 24 | 39 |
| | Polystyrene Seed | |
| 10 | 2 | 2 |
| | 4 | 4 |
| | 8 | 9 |
| | 20 | 23 |
| | 24 | 26 |

Thus it can be seen that the rate of copolymerization of butadiene-styrene to a rubber is not changed by the addition of a polystyrene seed latex by the process of U.S. Pat. No. 3,372,134 and is distinguished from applicants' process.

We claim:

1. A process for the preparation of a polymer blend comprising homopolymerizing a monomer selected from the group consisting of butadiene and isoprene in a batch charge in aqueous emulsion in the presence of a free-radical polymerization initiator and from about 5 to 160 parts by weight per 100 parts by weight of said diene monomer of a seed polymer selected from the group consisting of polymethacrylonitrile, copolymers of methacrylonitrile with up to about 20% by weight of another monovinyl monomer, polymethyl acrylate, polymethyl methacrylate, polyacrylonitrile, and acrylonitrile copolymers with up to 30% by weight of another monovinyl monomer, said seed polymer having an average particle size of from about 300 to about 1000 A, the final polymer being a blend containing said seed polymer said hompolymerization being conducted at improved polymerization rates, said blend being the homopolymer product and said seed polymer.

2. The process of claim 1 wherein the preparation is carried out at a temperature in the range of from about 0° C to 100° C in the substantial absence of oxygen.

3. The process of claim 2 wherein the seed polymer is a copolymer of 95% by weight of methacrylonitrile and 5% by weight of methyl methacrylate.

4. The process of claim 2 wherein the seed polymer is polymethyl acrylate.

5. The process of claim 2 wherein the seed polymer is polymethyl methacrylate.

6. The process of claim 2 wherein the seed polymer is a copolymer of 75% by weight acrylonitrile and 25% by weight methyl acrylate.

* * * * *